(12) United States Patent
Cho et al.

(10) Patent No.: US 7,701,921 B2
(45) Date of Patent: Apr. 20, 2010

(54) APPARATUS AND METHOD FOR SUPPORTING SOFT COMBINING OF SCHEDULING SIGNALS FOR UPLINK PACKET DATA SERVICE IN A MOBILE COMMUNICATION SYSTEM

(75) Inventors: Joon-Young Cho, Suwon-si (KR); Ju-Ho Lee, Suwon-si (KR); Sung-Ho Choi, Suwon-si (KR); Eun-Jung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 710 days.

(21) Appl. No.: 11/121,032

(22) Filed: May 4, 2005

(65) Prior Publication Data
US 2005/0249187 A1 Nov. 10, 2005

(30) Foreign Application Priority Data
May 4, 2004 (KR) ............... 10-2004-0031552

(51) Int. Cl.
*H04J 3/24* (2006.01)
*H04L 12/66* (2006.01)
(52) U.S. Cl. .................... 370/349; 370/352
(58) Field of Classification Search ........... 370/349, 370/431, 352, 335, 428, 331, 342, 310, 329; 455/438, 450, 442, 522, 561, 407
See application file for complete search history.

(56) References Cited

U.S. PATENT DOCUMENTS

| | | | | |
|---|---|---|---|---|
| 5,530,918 | A * | 6/1996 | Jasinski ................ | 340/7.25 |
| 5,923,650 | A * | 7/1999 | Chen et al. ............ | 370/331 |
| 6,775,256 | B1 * | 8/2004 | Hill et al. .............. | 370/335 |
| 6,993,342 | B2 * | 1/2006 | Kuchibhotla et al. ... | 455/450 |
| 7,162,683 | B2 * | 1/2007 | Bune .................... | 714/794 |
| 2004/0037261 | A1 * | 2/2004 | Suzuki .................. | 370/342 |
| 2004/0214602 | A1 * | 10/2004 | Aoyama ............... | 455/561 |

(Continued)

FOREIGN PATENT DOCUMENTS

JP    2001-238256    8/2001

(Continued)

OTHER PUBLICATIONS

3$^{RD}$ Generation Partnership Project, "3GPP TR 25.896, V6.0.0 (Mar. 2004), 3$^{RD}$ Generation Partnership Project; Technical Specification Group Radio Access Network; Feasibility Study For Enhanced Uplink For UTRA FDD (Release 6)", 2004, pp. 1-27.

(Continued)

*Primary Examiner*—Charles N Appiah
*Assistant Examiner*—Kiet Doan
(74) *Attorney, Agent, or Firm*—Roylance, Abrams, Berdo and Goodman, LLP

(57) ABSTRACT

A mobile communication system using an Enhanced Uplink Dedicated transport Channel (EUDCH) for uplink data transmission, wherein a user equipment (UE) receives cell group information from a radio network controller (RNC), and soft-combines scheduling signals or acknowledge/negative-acknowledge (ACK/NACK) signals received from cells belonging to the same cell group according to the cell group information, thereby improving detection performance.

32 Claims, 8 Drawing Sheets

U.S. PATENT DOCUMENTS

| | | | |
|---|---|---|---|
| 2004/0219919 A1* | 11/2004 | Whinnett et al. | 455/442 |
| 2004/0219920 A1* | 11/2004 | Love et al. | 455/442 |
| 2004/0223507 A1* | 11/2004 | Kuchibhotla et al. | 370/428 |
| 2005/0030964 A1* | 2/2005 | Tiedemann et al. | 370/431 |
| 2005/0047393 A1* | 3/2005 | Liu | 370/352 |
| 2005/0048975 A1* | 3/2005 | Ranta-Aho et al. | 455/438 |
| 2006/0105796 A1* | 5/2006 | Malladi et al. | 455/522 |
| 2006/0256756 A1* | 11/2006 | Wakabayashi | 370/335 |

FOREIGN PATENT DOCUMENTS

| | | |
|---|---|---|
| JP | 2002-064848 | 2/2002 |
| WO | WO 2004-014097 A1 | 2/2004 |
| WO | WO 2004/034656 A2 | 4/2004 |

OTHER PUBLICATIONS

Lucent Technologies, "Enhancing The Uplink DSCH-Scheduling Options", Nov. 5, 2002, pp. 1-6, Shanghai, China.

* cited by examiner

Radio Link Setup/Add Response

| Name | Need | Value |
|---|---|---|
| RL Information Response IE | | 1..<maxnoofRLs> |
| >RL ID | M | |
| >RL Set ID | M | |
| >Scheduling Cell Group ID | O | |
| >Ack/NackACK/NACK Cell Group ID | O | |
| >Exclusion Cell Indicator | O | |

FIG.8

Active Set Update Request

| Name | Need | Value |
|---|---|---|
| Explicit Cell Group Indicator | OP | |
| Radio link addition information | OP | 1 to <maxRL-1> |
| > Downlink DPCH info for each RL | MP | |
| >> TPC combination index | MP | |
| >> Scheduling Cell Group Index | CV_Explicit | |
| >> Ack/NackACK/NACK Cell Group Index | CV_Explicit | |
| >> Exclusion Cell Indicator | OP | |

| CONDITION | DESCRIPTION |
|---|---|
| Explicit | IF "Explicit Cell Group Indicator" IS SET TO "On," CORRESPONDING PARAMETERS MUST BE INCLUDED MANDATORILY. OTHERWISE, CORRESPONDING PARAMETERS ARE NOT INCLUDED. |

FIG.9

APPARATUS AND METHOD FOR SUPPORTING SOFT COMBINING OF SCHEDULING SIGNALS FOR UPLINK PACKET DATA SERVICE IN A MOBILE COMMUNICATION SYSTEM

CROSS-REFERENCE TO RELATED APPLICATIONS

This application claims the benefit under 35 U.S.C. §119 (a) of Korean Patent Application No. 10-2004-0031552 entitled "Apparatus And Method For Supporting Soft Combining Of Scheduling Signals From Cells In The Same Node B For Uplink Dedicated Channel Data In Softer Handover In A Mobile Communication System" filed in the Korean Intellectual Property Office on May 4, 2004, the entire disclosure of which is incorporated herein by reference.

BACKGROUND OF THE INVENTION

1. Field of the Invention

The present invention relates generally to an apparatus and method for efficiently transmitting/receiving scheduling information in a mobile communication system supporting an uplink packet data service. In particular, the present invention relates to an apparatus and method for performing soft combining on scheduling signals or ACK/NACK signals received from a plurality of cells in the case where a user equipment (UE) is located in a handover region.

2. Description of the Related Art

A Wideband Code Division Multiple Access (WCDMA) system uses an Enhanced Uplink Dedicated transport Channel (EUDCH). A EUDCH service has been proposed to improve transmission performance of uplink packet data in the WCDMA system. In the EUDCH service, transmission approval/disapproval of uplink packet data and a possible upper limit of a data rate for each UE are determined by a Node B. The information determined by the Node B is transmitted to the UE as a scheduling command. In response, the UE determines a rate of EUDCH data according to the scheduling command, and transmits data to the Node B through an uplink at the determined data rate. Further, in the EUDCH service, a Hybrid Automatic Retransmission Request (HARQ) technique is used. Therefore, the Node B determines whether it has succeeded or failed in decoding data received from the UE, and transmits an acknowledge (ACK) signal or a negative acknowledge (NACK) signal to the UE depending on the determination result.

FIG. 1 is a concept diagram for a description of a scheduling operation performed by a Node B in a mobile communication system supporting a EUDCH service. In FIG. 1, reference numeral 100 represents a Node B supporting the EUDCH service, and reference numerals 110 to 116 represent UEs transmitting EUDCH data.

If a data rate of a UE increases, reception power at which the Node B receives data from the UE increases. Therefore, a Rise over Thermal (RoT) of the UE occupies a larger portion of the total RoT. However, a decrease in data rate of a UE reduces reception power at which the Node B receives data from the UE. In this case, a RoT of the UE occupies a lesser portion of the total RoT. Therefore, the Node B performs scheduling on EUDCH packet data by taking into consideration a relation between the data rate and radio resources, and a data rate requested by the UE. The Node B limits the amount of uplink signal that it can receive while guaranteeing its reception performance. Equation (1) below illustrates the amount of uplink signal that the Node B can receive while guaranteeing its reception performance.

$$RoT = I_o/N_o \quad (1)$$

In Equation (1), $I_o$ denotes the full reception band's power spectral density of the Node B, and $N_o$ denotes a thermal noise power spectral density of the Node B. Therefore, the RoT indicates available radio resources that the Node B can allocate for the EUDCH packet data service in an uplink.

As described above, the Node B allocates data rates to UEs such that a measured RoT of the Node B should not exceed a target RoT. That is, the Node B can allocate a lower data rate to a UE located at a long distance and a higher data rate to a UE located at a short distance.

The UEs transmit packet data with different uplink channel transmission power according to their distances from the Node B. That is, the UE 110 that is located the farthest from the Node B 100 transmits packet data with the highest transmission power 120 for uplink channels, and the UE 114 that is located the nearest to the Node B 100 transmits packet data with the lowest transmission power 124 for uplink channels. Transmission power and packet data rates applied in the UEs can be changed according to a scheduling algorithm applied in the Node B.

FIG. 2 is a diagram illustrating a basic procedure needed between a Node B 200 and a UE 202 for packet data transmission through a EUDCH. Referring to FIG. 2, in step 204, a EUDCH is set up between the Node B 200 and the UE 202. The step 204 includes a process of transmitting/receiving messages over a dedicated transport channel. Thereafter, in step 206, the UE 202 transmits information on a needed data rate and other information, based on which an uplink channel condition can be determined, to the Node B 200. The information, based on which an uplink channel condition can be determined, includes transmission power of an uplink channel that the UE 202 transmits, and a transmission power margin of the UE 202.

Upon receiving information on the uplink channel transmission power, the Node B 200 can estimate an uplink channel condition by comparing the transmission power with the reception power of the uplink channel. If a difference between the uplink channel transmission power and the uplink channel reception power is small, the Node B 200 determines that the uplink channel condition is good. However, if the difference between the transmission power and the reception power is large, the Node B 200 determines that the uplink channel condition is bad.

In the case where the UE 202 transmits its transmission power margin, the Node B 200 can estimate an uplink transmission power by subtracting the transmission power margin from the possible maximum transmission power of the UE 202 that is already known to the Node B 200. The Node B 200 then determines a possible maximum data rate for an uplink packet channel of the UE 202 or determines whether to increase or decrease a next data rate of the UE 202, using the estimated uplink channel condition of the UE 202, information on a data rate needed by the UE 202, and information on the total power of an uplink interference signal received from the UE 202. The information on the determined possible maximum data rate and increase/decrease in the next data rate is provided to the UE 202 as a downlink scheduling signal in step 208.

The UE 202 then determines a data rate for its transmission packet data according to the notified possible maximum data rate or rate increase/decrease command, and transmits the packet data to the Node B 200 at the determined data rate in step 210. The Node B 200 then receives the packet data and decodes the received packet data. If the Node B 200 succeeds in decoding the packet data, it transmits an ACK signal to the UE 202 in step 212, and the Node B 202 then transmits new packet data to the Node B 200 in the manner described in the step 210. However, if the Node B 200 fails in decoding the packet data, it transmits a NACK signal to the UE 202 in step 212. In this case, the UE 202 retransmits the data transmitted in the step 210.

As described above, when a UE is located in a soft or softer handover region, power control for the UE is achieved through pilot signals on dedicated physical control channels (DPCCHs) received from cells in an active set. That is, the power control is performed based on a signal-to-interference-plus-noise ratio (SINR) determined after soft-combining the pilot signals.

As a result, a scheduling signal and an ACK/NACK signal transmitted by each cell for a EUDCH packet are transmitted at a lower power as compared with the case where the UE is not located in a handover region. Therefore, the UE cannot guarantee reliability for a scheduling signal and an ACK/NACK signal from each cell.

Accordingly, a need exists for a system and method for receiving cell group information, and combining scheduling signals or acknowledge/negative-acknowledge (ACK/NACK) signals to improve performance.

SUMMARY OF THE INVENTION

It is, therefore, an object of the present invention to provide an apparatus and method for reducing signaling overhead for an uplink packet data service.

It is another object of the present invention to provide an apparatus and method for performing soft combining by a UE in a mobile communication system supporting an uplink packet data service.

It is another object of the present invention to provide an apparatus and method in which a Node B transmits information on cells transmitting the same scheduling signals or ACK/NACK signals, to a radio network controller (RNC) in a mobile communication system supporting an uplink packet data service.

It is yet another object of the present invention to provide an apparatus and method in which an RNC transmits information on cells transmitting the same scheduling signals or ACK/NACK signals, to a UE in a mobile communication system supporting an uplink packet data service.

It is still another object of the present invention to provide an apparatus and method for performing soft combining by a UE using information on cells transmitting the same scheduling signals or ACK/NACK signals in a mobile communication system supporting an uplink packet data service.

According to one aspect of the present invention, a method is provided for receiving scheduling signals for an uplink packet data service by a user equipment (UE) in a mobile communication system, the method comprising the steps of acquiring cell group information from a radio network controller (RNC) representing at least two scheduling cell groups transmitting different scheduling signals for controlling a data rate of the uplink packet data service, each of scheduling cell groups including at least one cell transmitting the same scheduling signal and the scheduling cell groups controlled by a Node B, receiving and demodulating scheduling signals received from a plurality of cells, and soft-combining scheduling signals received from cells belonging to the each scheduling cell group according to the cell group information; and then determining the data rate for the uplink packet data service according to the soft-combined signals and at least one non-soft-combined scheduling signal.

According to another aspect of the present invention, a user equipment (UE) apparatus is provided for receiving scheduling signals for an uplink packet data service in a mobile communication system, the apparatus comprising a scheduling signal reception controller for acquiring cell group information representing at least two scheduling cell groups transmitting different scheduling signals for controlling a data rate of the uplink packet data service from a radio network controller (RNC), each of the scheduling cell groups including at least one cell transmitting the same scheduling signal and the scheduling cell groups controlled by a Node B, at least one scheduling signal demodulator for independently demodulating scheduling signals received from a plurality of cells, and a soft combiner for soft-combining scheduling signals from cells belonging to the each scheduling cell group from among the scheduling signals received by the scheduling signal demodulators according to the cell group information. The apparatus further comprises message decoders for decoding an output signal of the soft combiner or the scheduling signals received by the scheduling signal demodulators, and a data rate decider for determining the data rate for the uplink packet data service according to output signals of the message decoders.

According to yet another aspect of the present invention, a method is provided for supporting soft combining of scheduling signals for an uplink packet data service by a Node B in a mobile communication system, the method comprising the steps of determining cells transmitting the same scheduling signals from among a plurality of cells controlled by the Node B, informing a radio network controller (RNC) controlling the Node B of a scheduling cell group representing cells transmitting the same scheduling signals, generating the same scheduling signals for a user equipment (UE) that performs the uplink packet data service and which is located in at least one of cells in the scheduling cell group, and transmitting the generated scheduling signals to the UE through each of the cells in the scheduling cell group.

According to yet another aspect of the present invention, a Node B apparatus is provided for supporting soft combining of scheduling signals for an uplink packet data service in a mobile communication system, the apparatus comprising a scheduling signal transmission controller for determining cells transmitting the same scheduling signals from among a plurality of cells controlled by the Node B, and for informing a radio network controller (RNC) controlling the Node B of a scheduling cell group representing cells transmitting the same scheduling signals. The apparatus further comprises a scheduling signal generator for generating the same scheduling signals for a user equipment (UE) that performs the uplink packet data service and which is located in at least one of cells in the scheduling cell group, and cell transmitters for transmitting the generated scheduling signals to the UE through each of the cells in the scheduling cell group.

According to still another aspect of the present invention, a method is provided for supporting soft combining of scheduling signals for an uplink packet data service by a radio link controller (RNC) in a mobile communication system, the method comprising the steps of receiving cell group information representing cells transmitting the same scheduling signals from a Node B controlling a plurality of cells, and transmitting the cell group information to a user equipment (UE) that performs the uplink packet data service and which is located in at least one of the plurality of cells.

According to still another aspect of the present invention, a radio network controller (RNC) apparatus is provided for supporting soft combining of scheduling signals for an uplink packet data service in a mobile communication system, the apparatus comprising a receiver for receiving cell group information representing cells transmitting the same scheduling signals from a Node B controlling a plurality of cells, and a transmitter for transmitting the cell group information to a user equipment (UE) that performs the uplink packet data service and which is located in at least one of the plurality of cells.

BRIEF DESCRIPTION OF THE DRAWINGS

The above and other objects, features and advantages of the present invention will become more apparent from the following detailed description when taken in conjunction with the accompanying drawings, in which:

FIG. 8 is a diagram illustrating a format of an Iub signaling message for supporting soft combining according to an embodiment of the present invention; and FIG. 9 is a diagram illustrating a format of an RRC signaling message for supporting soft combining according to an embodiment of the present invention.

Throughout the drawings, like reference numerals will be understood to refer to like parts, components and structures.

DETAILED DESCRIPTION OF THE EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

According to an embodiment of the present invention, when a user equipment (UE) is located in a soft or softer handover region, a plurality of cells controlled by the same Node B or different Nodes B are controlled to transmit the same scheduling signals or ACK/NACK signals to the UE, thereby obtaining a receive diversity gain. That is, embodiments of the present invention improve detection performance by allowing a UE to perform soft combining on the same scheduling or ACK/NACK signals transmitted through a plurality of cells. In addition, embodiments of the present invention propose a Radio Resource Control (RRC) and Iub signaling messages for supporting soft combining.

Figure 1:
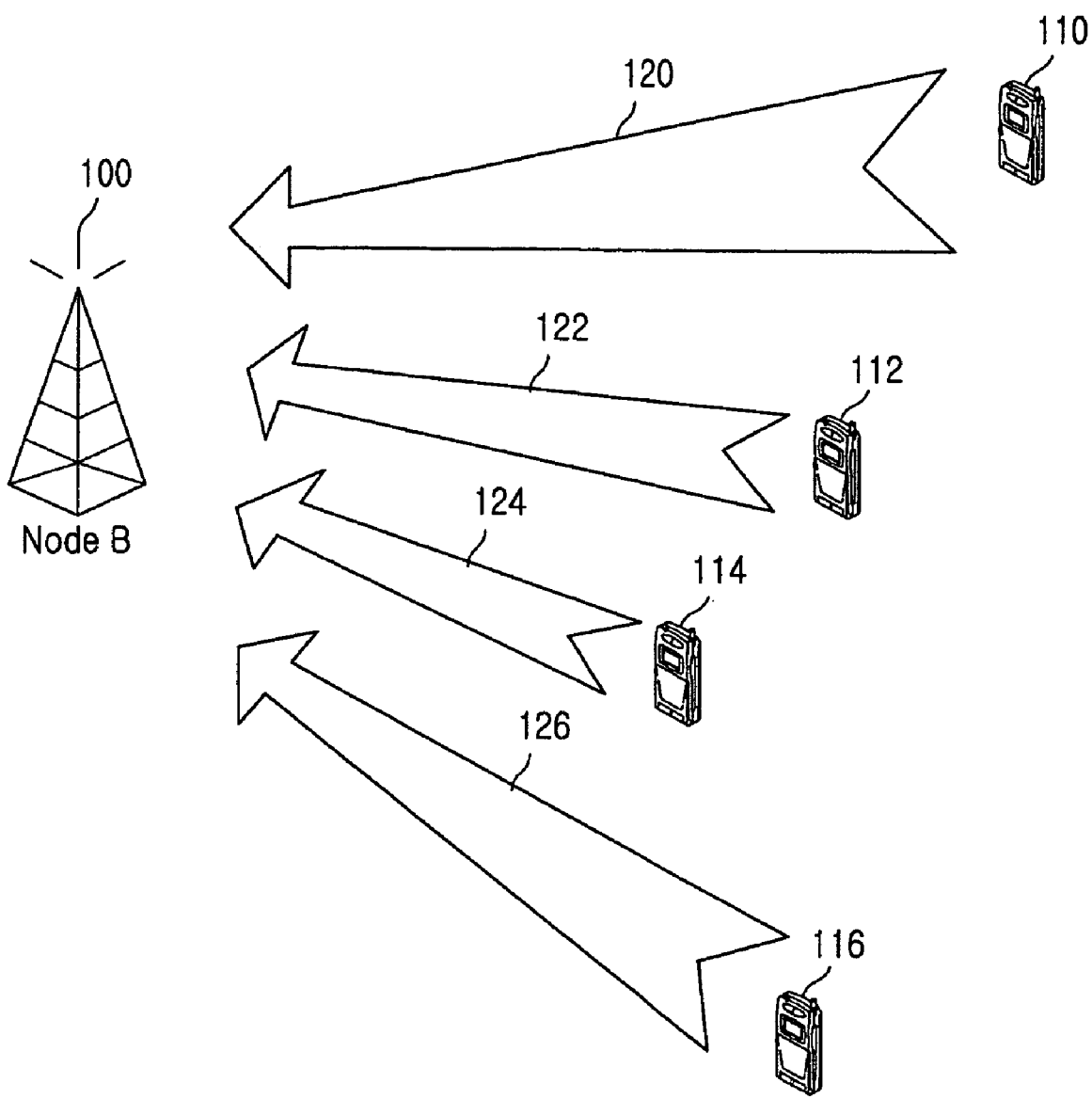
FIG. 1 is a diagram illustrating a Node B and UEs supporting an uplink packet data service.
Figure 2:
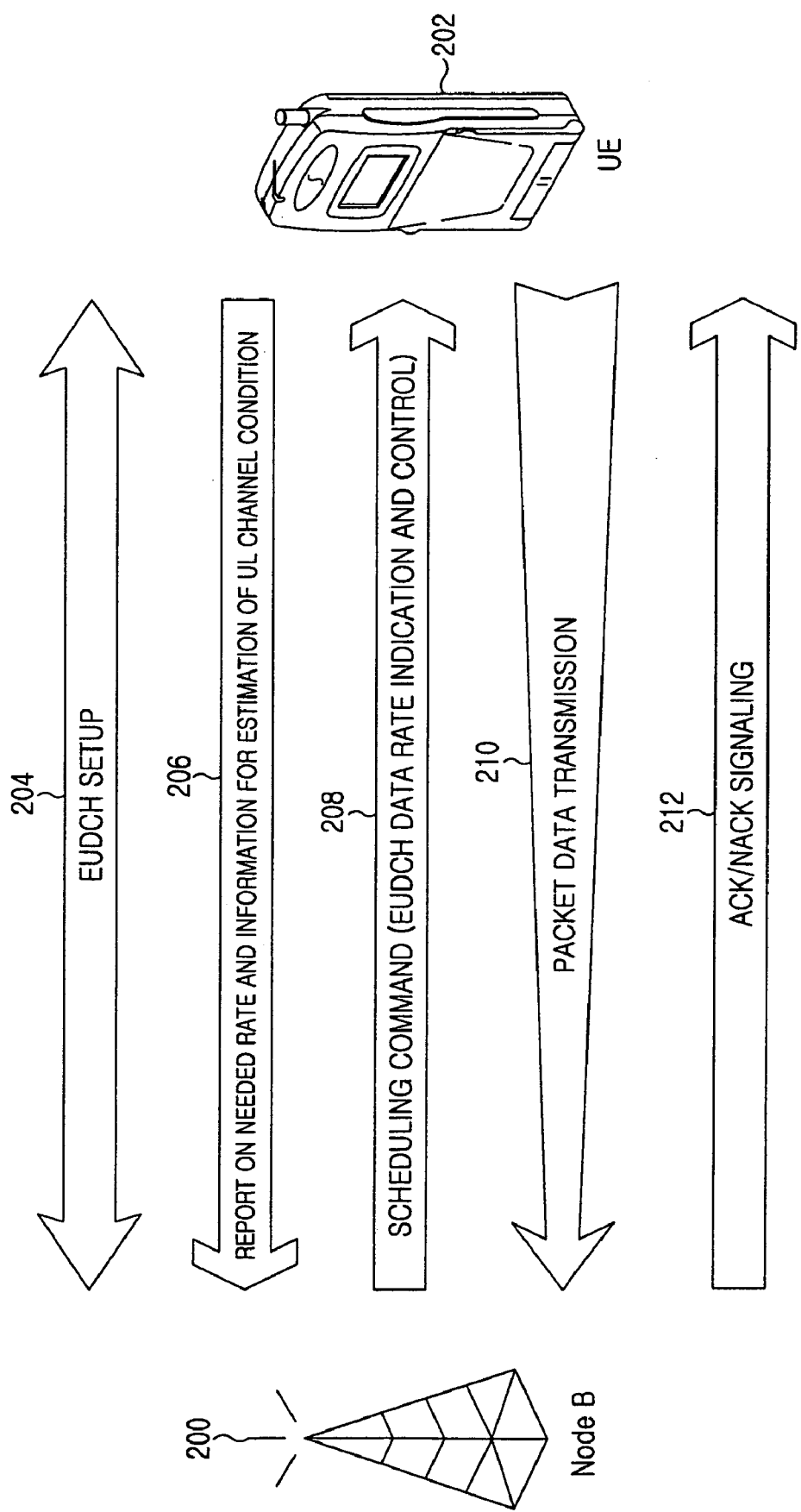
FIG. 2 is a diagram illustrating information exchanged between a UE supporting an uplink packet data service and a Node B.
Figure 3:
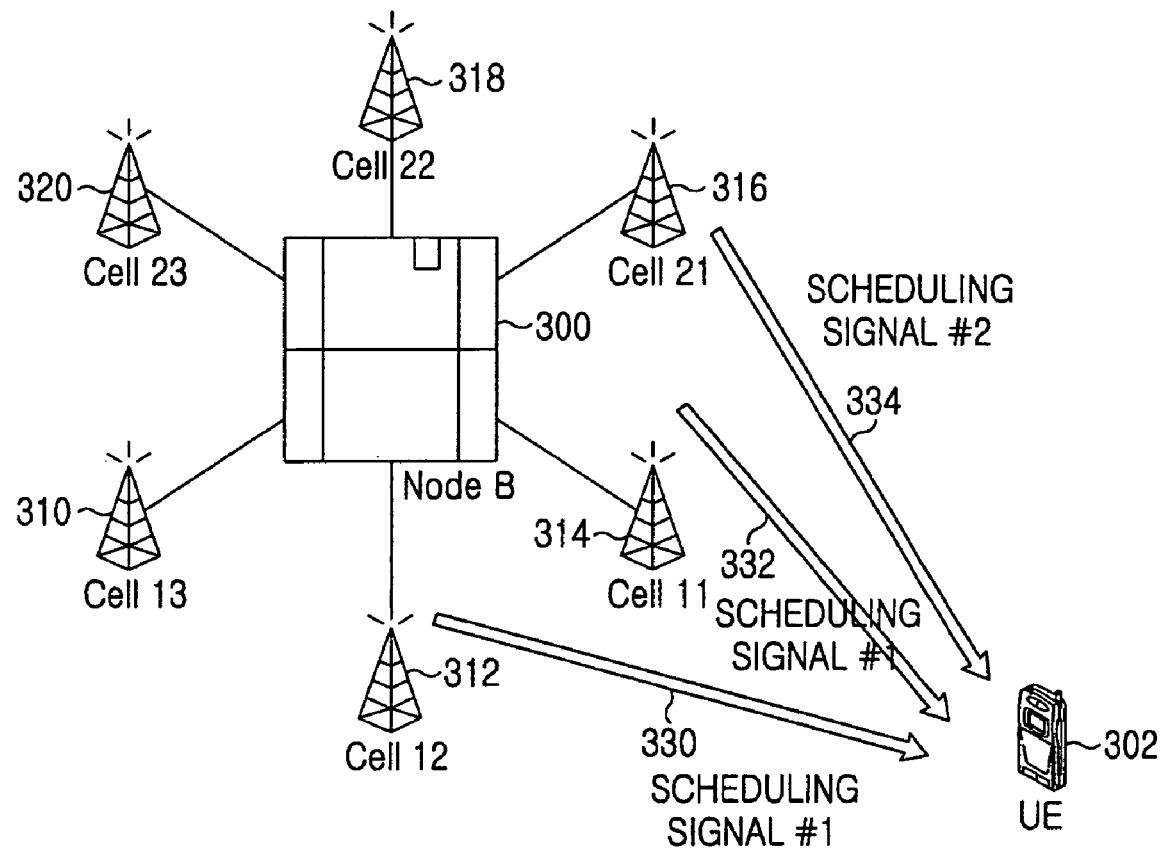
FIG. 3 is a diagram illustrating a situation in which a UE using an uplink packet data service is located in a softer handover region.

FIG. 3 is a diagram illustrating an example situation in which a UE using an uplink packet data service (or a EUDCH service) is located in a softer handover region. Referring to FIG. 3, a Node B 300 controls six cells 310, 312, 314, 316, 318, and 320. A UE 302 using a EUDCH service is also located in a softer handover region of the Node B 300. In the example of FIG. 3, the UE 302 is shown receiving scheduling signals from cell#12 312, cell#11 314, and cell#21 316. From among the three cells 312, 314 and 316, the cell#12 312 and the cell#11 314 transmit the same scheduling signals 330 and 332, and the cell#21 316 transmits a scheduling signal 334 independently of the cell#12 312 and the cell#11 314. For example, the foregoing situation may occur in the case where the transceivers of the cell#12 312 and the cell#11 314 exist in the same channel card, and the transceiver of the cell#21 316 exists in a different channel card in terms of hardware.

The UE 302 performs decoding on the scheduling signals#1 330 and 332 received from the cell#12 312 and the cell#11 314 after soft combining, thereby improving detection performance. However, as the scheduling signal#2 334 received from the cell#21 316 is independent from the scheduling signals#1 330 and 332, the UE 302 decodes the scheduling signal#2 334 without soft combining.

In supporting soft combining in the situation of FIG. 3, an ACK/NACK signal also undergoes the foregoing operation. However, for the scheduling signals, there are additional particulars that should be taken into consideration.

Specifically, in the case where scheduling signals undergo soft combining, when each cell determines a scheduling signal to be transmitted to a UE, a Rise over Thermal (RoT) level of each cell becomes an important factor that should be taken into consideration. If an RoT level of a particular cell from among the cells in an active set is very high, a scheduling signal transmitted from the cell to the UE to prevent an increase in interference in the cell may greatly affect an operation of determining a EUDCH data rate. In this case, it is more efficient for only the above cell or the cell using the same channel card as that of the above cell to transmit its scheduling signal, and the other cells do not transmit their scheduling signals. In addition, because of hardware implementation complexity of a scheduler and an increase in size of a scheduling message, it can be difficult for several cells to transmit the same scheduling signals. Taking the foregoing particulars into consideration, a scheduling signal and an ACK/NACK signal may each require a separate signaling message in order to inform a Node B and a UE of the cells transmitting the same scheduling or ACK/NACK signals.

Figure 4:
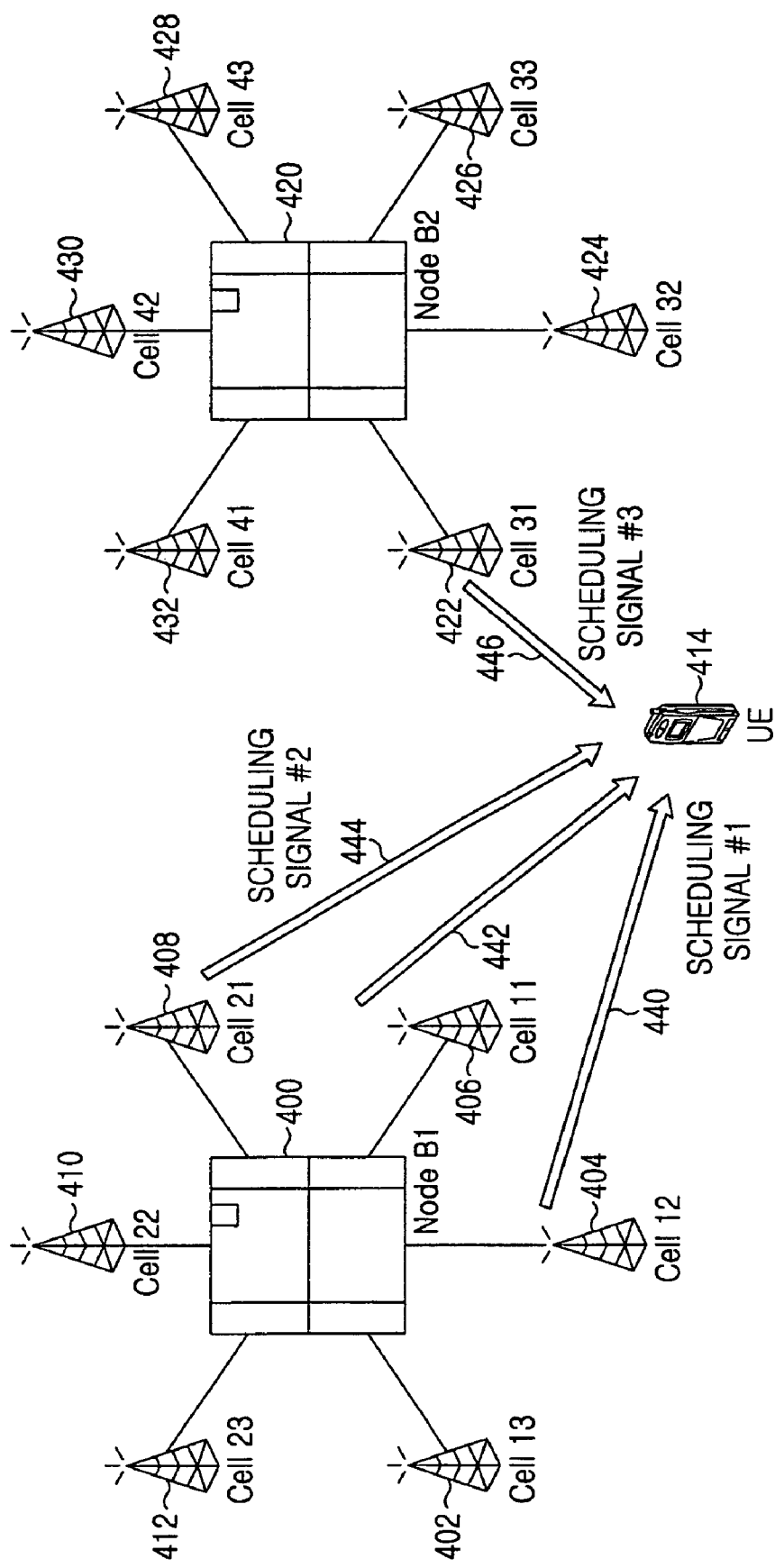
FIG. 4 is a diagram illustrating a situation in which a UE using an uplink packet data service is located in both softer and soft handover regions.

FIG. 4 is a diagram illustrating an example situation in which a UE using an uplink packet data service is located in both softer and soft handover regions. Referring to FIG. 4, a Node B#1 400 controls six cells 402, 404, 406, 408, 410, and 412, and a Node B#2 420 controls six cells 422, 424, 426, 428, 430, and 432. In the example of FIG. 4, a UE 414 is shown receiving scheduling signals#1 440 and 442 from the cell#12 404 and the cell#11 406, and a scheduling signal#2 444 from the cell#21 408, which are each controlled by the Node B#1 400. The UE 414 additionally receives a scheduling signal#3 446 from the cell#31 422 which is controlled by the Node B#2 420. It can be seen in FIG. 4 that cells controlled by the different Nodes B 400 and 420 transmit independent scheduling signals and ACK/NACK signals. That is, the Nodes B 400 and 420 each transmit an independent scheduling signal and ACK/NACK signal in order to support fast scheduling and HARQ operations for EUDCH data.

The embodiments of the present invention propose a transmission method of scheduling signals and ACK/NACK signals of each Node B and signaling methods for enabling soft combining in a UE, when the UE is located in the softer and/or soft handover regions.

1. Method 1: Radio Link Set Used

In the Wideband Code Division Multiple Access (WCDMA) system standard, a group of cells transmitting the same downlink power control commands (or transmission power control bits (TPCs)) to a UE are defined as a TPC radio link set, and it is provided therein that the TPC radio link set information should be signaled to the UE. Therefore, in order to inform the UE of the cells transmitting the same scheduling and ACK/NACK signals, cells in the TPC radio link set transmit the same scheduling and ACK/NACK signals, instead of using separate signaling messages. This is defined as inexplicit indication.

2. Method 2: Separate Iub Signaling and RRC Signaling Used

Method 2 is applied when a group of cells transmitting the same scheduling signals or ACK/NACK signals are set independently of the TPC radio link set defining a group of cells transmitting TPCs in Method 1. That is, for each transmission of the scheduling signals and the ACK/NACK signals, separate additional Iub and Radio Resource Control (RRC) signaling messages are defined. Therefore, a Node B informs a Radio Network Controller (RNC) of a newly defined group of cells transmitting the same scheduling or ACK/NACK signals through an Iub signaling, and the RNC informs a UE of the group of cells through an RRC signaling. In addition, the cells which are included in an active set but determined not to transmit the scheduling signals or the ACK/NACK signals, are also reported to the UE through the foregoing signaling.

3. Method 3: Used to Indicate Application of Method 1 and Method 2

By additionally defining an RRC signaling message for indicating to a UE which of Methods 1 and 2 will be applied, Method 3 allows a UE to appropriately perform soft combining on scheduling signals and ACK/NACK signals.

A detailed description will now be made of a process in which the foregoing methods are applied in accordance with an embodiment of the present invention.

Figure 5:
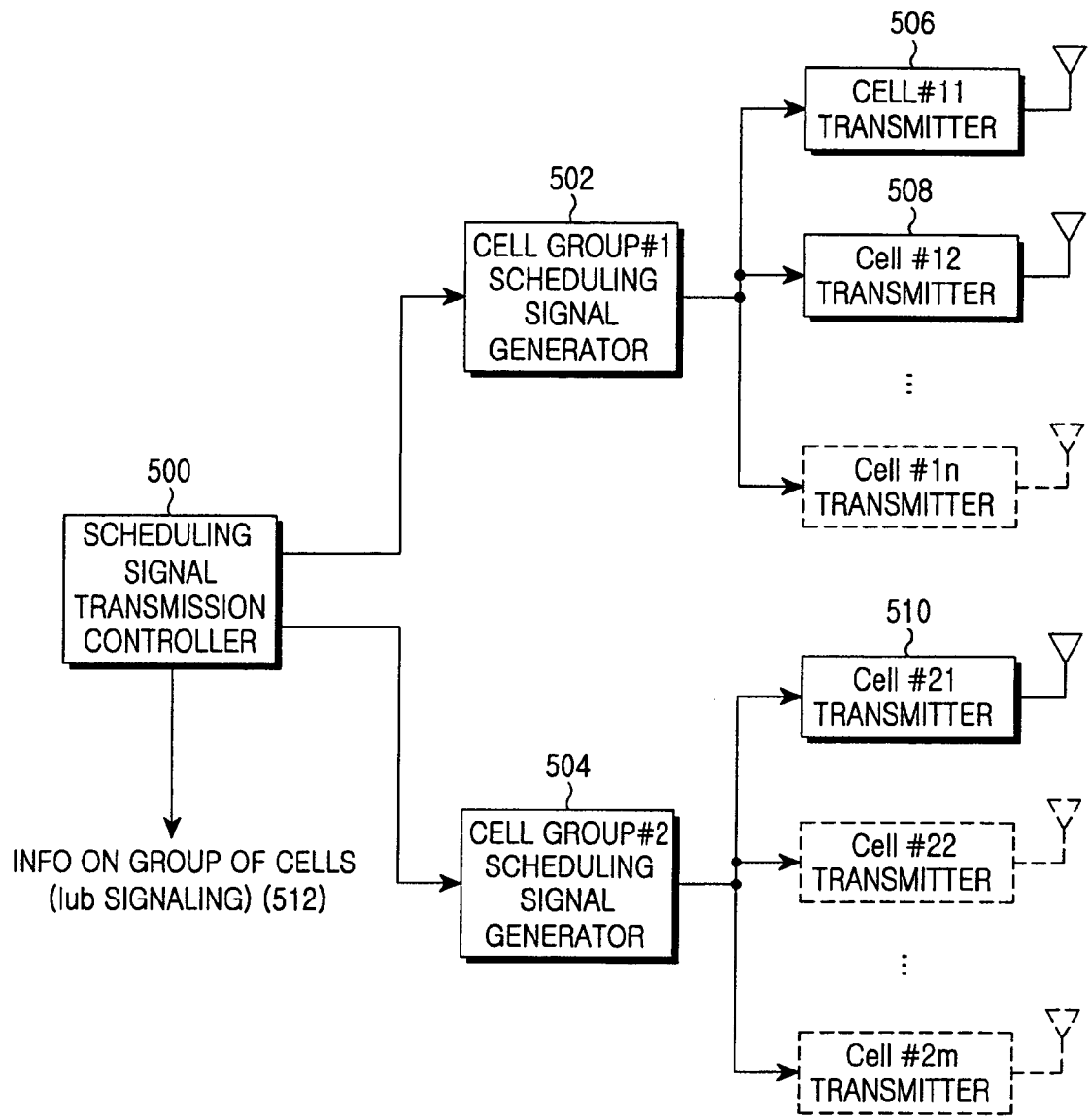
FIG. 5 is a diagram illustrating a structure of a Node B transmitter according to an embodiment of the present invention.

FIG. 5 is a diagram illustrating a structure of a scheduling signal transmitter for a Node B according to an embodiment of the present invention. Herein, the Node B performs scheduling on EUDCH transmission of a UE while considering a RoT level of each cell belonging thereto, a state of a EUDCH data buffer for the UE, and a transmission power margin of the UE. The Node B can transmit a simple data rate control signal representing a rate-up/keep/down signal to the UE as a scheduling signal. Alternatively, the Node B can transmit more complicated information representing a transmission data rate and a transmission time.

Referring to FIG. 5, it can be seen that there are two groups of cells 502 and 504 in the Node B which can transmit the same scheduling signals. A scheduling signal generator-for-cell group#1 (that is cell group#1 scheduling signal generator) 502 and a scheduling signal generator-for-cell group#2 (that is, cell group#2 scheduling signal generator) 504, generate scheduling signals to be transmitted by the cells belonging to the cell group#1 and the cell group#2, respectively. When a cell#11, a cell#12, and a cell#21 are included in an active set of a UE, the generated scheduling signals are transmitted by transmitters 506, 508, and 510, for the cell#11, cell#12, and cell#21, respectively, to the UE. In this case, the scheduling signals transmitted from the cell group#1 and the cell group#2 are independent from each other, and in the case of the cell group#1, the UE performs soft combining on the scheduling signals received from the transmitter 506 for the cell#11 and the transmitter 508 for the cell#12, thereby contributing to an improvement in detection performance.

In another method according to an embodiment of the present invention, the Node B allows only particular cells to transmit scheduling signals instead of allowing all the cells in the active set to transmit scheduling signals, and a UE receives only the scheduling signals transmitted from the particular cells.

In this case, the cells transmitting the scheduling signals can be determined by the Node B taking an RoT level of each cell into consideration. For example, in FIG. 5, if an RoT level of the cell#12 is very high, the transmitters 506 and 508 for the cell group#1 to which the cell#12 belongs, can transmit scheduling signals for which an RoT level of the cell#12 is considered to the UE. The transmitter 510 for the cell group#2 can transmit no scheduling signal in order to prevent an increase in interference in the cell#12. This operation can contribute to a reduction in downlink interference and a reduction in power consumption for the cell#21 in the cell group#2, which transmits no scheduling signal. In FIG. 5, the foregoing operation is controlled by a scheduling signal transmission controller 500, and the scheduling signal transmission controller 500 provides an RNC with information on the group of cells transmitting the same scheduling signals through an Iub signaling.

Figure 6:
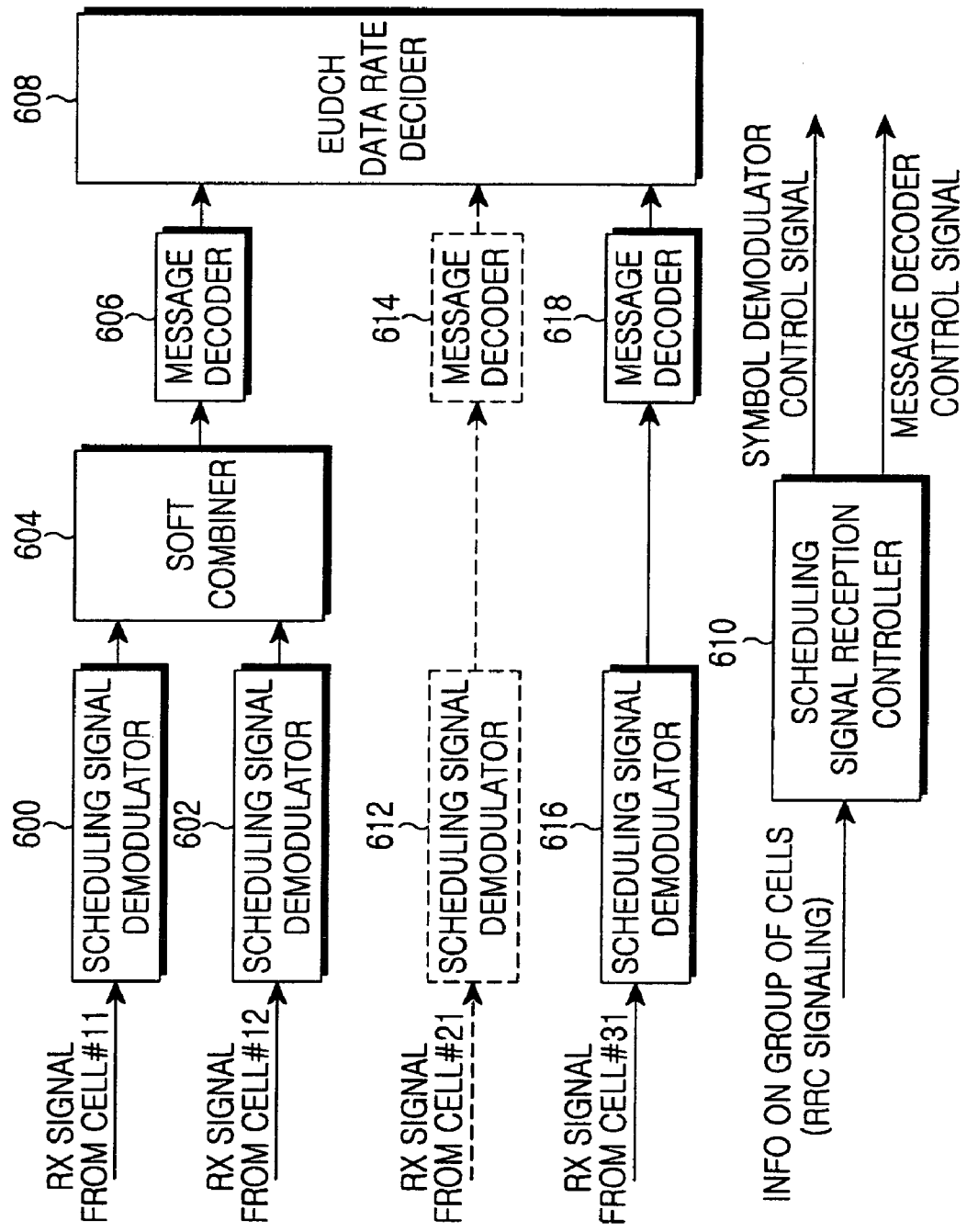
FIG. 6 is a diagram illustrating a structure of a UE receiver according to an embodiment of the present invention.
Figure 7:
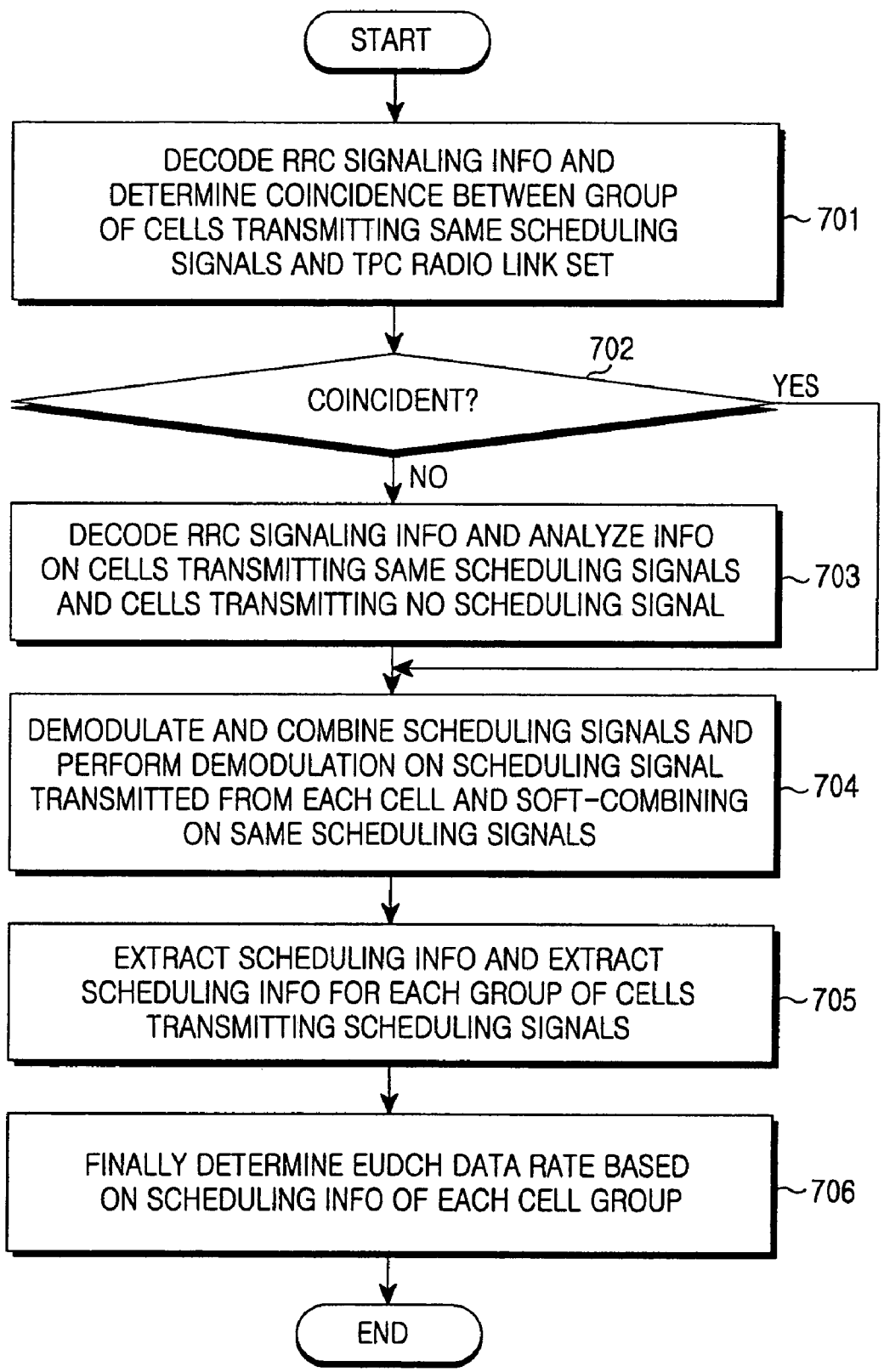
FIG. 7 is a flowchart illustrating a procedure for receiving scheduling signals for an uplink packet data service by a UE according to an embodiment of the present invention.

FIG. 6 is a diagram illustrating a structure of a UE receiver for detecting a scheduling signal according to an embodiment of the present invention, and FIG. 7 is a flowchart illustrating an operating procedure of the UE receiver illustrated in FIG. 6.

Referring to FIGS. 6 and 7, four cells, cell#11, cell#12, cell#21, and cell#31, are included in an active set of a UE. The cell#11 and the cell#12 transmit the same scheduling signals, and the cell#21 and the cell#31 transmit scheduling signals independently of the cell#11. Herein, a cell#xy refers to a $y^{th}$ cell belonging to a cell group #x.

Referring now to FIG. 7, in steps 701 and 702, before demodulating scheduling signals from the cells, a UE receives information indicating whether a group of cells transmitting the same scheduling signals is coincident with a TPC radio link set representative of a group of cells transmitting TPCs from an RNC through an RRC signaling. That is, if the cell#11 and the cell#12 constitute one TPC radio link set, and the cell#21 and the cell#31 individually form independent TPC radio link sets, the UE receives TPC radio link set information for the TPC radio link sets through the RRC signaling.

If it is determined in step 702 that a group of cells transmitting the same scheduling signals form a group which is not coincident with the TPC radio link set, the UE proceeds to step 703. In step 703, the UE receives scheduling cell group information for a group of cells transmitting the same scheduling information and cells transmitting no scheduling signal from the RNC through an RRC signaling. However, if it is determined in step 702 that cells transmitting the same scheduling signals form a group which is coincident with the TPC radio link set, the UE proceeds to step 704.

Herein, the UE receives from the RNC, separate information indicating whether the TPC radio link set is coincident with the scheduling cell group, or simply determines whether scheduling cell group information is received. In this manner, the UE can determine whether the TPC radio link set is coincident with the scheduling cell group. That is, in steps 701 and 702, if no scheduling information is received, the UE determines that the scheduling cell group is coincident with the TPC radio link.

Thereafter, in step 704, a scheduling signal reception controller 610 of the UE generates a signal for controlling scheduling signal demodulators 600, 602, 612, and 616, and message decoders 606, 614, and 618, using the TPC radio link set information or cell group information received from the RNC. Because the cell#11 and the cell#12 transmit the same scheduling signals, their associated scheduling signal demodulators 600 and 602 demodulate scheduling signals from the cell#11 and the cell#12, and then output the demodulated scheduling signals to a soft combiner 604.

In step 705, the demodulated symbols that are combined by the soft combiner 604 are input to a message decoder 606, and the message decoder 606 decodes the combined demodulated symbol and outputs the scheduling information from the cell#11 and the cell#12. In the case of the scheduling signals received from the cell#21 and the cell#31, because there is no other cell transmitting the same scheduling signal, the scheduling signals received from the cell#21 and the cell#31 are demodulated in their associated scheduling signal demodulators 612 and 616, respectively. The demodulated scheduling signals are then subjected to independent decoding in their associated message decoders 614 and 618, respectively.

If the cell group information indicates that the cell#21 transmits no scheduling signal, the UE does not receive a scheduling signal from the cell#21, even though the cell#21 is included in its active set. In this case, under the control of the scheduling signal reception controller 610, the scheduling signal demodulator 612 and the message decoder 614 for the scheduling signal received from the cell#21 are disabled.

In step 706, a EUDCH data rate decider 608 determines a data rate of a EUDCH data packet to be transmitted next based on the scheduling information received from each cell or cell group.

The structure and operating procedures of the transceiver for scheduling signals according to embodiments of the present invention, can be applied even to the ACK/NACK signal in the same manner. However, a group of cells transmitting the same ACK/NACK signals may not be coincident with a group of cells transmitting the same scheduling signals.

A description will now be made in greater detail of a method and apparatus for providing a signaling for supporting an operation of transmitting/receiving the scheduling signals described in the foregoing embodiments.

First, when Method 1 is used, there is no signaling added.

Second, when Method 2 is used, the following signaling parameters (1), (2) and (3) are defined as follows.

(1) A Scheduling Cell Group ID comprises an identifier (ID) for distinguishing a group of cells that transmit the same scheduling signals such that a UE can perform soft combining.

(2) An ACK/NACK Cell Group ID comprises an ID for distinguishing a group of cells that transmit the same ACK/NACK signals such that a UE can perform soft combining.

(3) An Exclusion Cell Indicator comprises an indicator for indicating a cell that is included in an active set of a UE, but does not transmit scheduling information or ACK/NACK information. If an Exclusion Cell Indicator is set to 'on', it means that no scheduling information or ACK/NACK information is transmitted through a corresponding cell. An Exclusion Cell Indicator can be provided either separately or in common for the scheduling information and the ACK/NACK information The signaling parameters defined above are included in a message in which a Radio Link Set ID parameter of the existing NBAP (Node B Application Part protocol) and RNSAP (Radio Network Subsystem Application Part protocol) messages are included, and included in a message in which a TPC combination index parameter is included.

Herein, NBAP represents a protocol between a Node B and an RNC, and RNSAP represents a protocol between RNSs.

Third, when Method 3 is used, Method 3 defines signaling parameters in the same way as that used in Method 2. Method 3 is different from Method 2 in that the inclusion of the defined signaling parameters is determined according to circumstances. That is, when a Cell Group for transmission of scheduling information or ACK/NACK information is coincident with the TPC Radio Link Set, the signaling parameters (that is, Scheduling Cell Group ID, ACK/NACK Cell Group ID and Exclusion Cell Indicator) are not included in a signaling message, and when a Cell Group for transmission of scheduling information or ACK/NACK information is not coincident with the TPC Radio Link Set, the signaling parameters are included in a signaling message.

When the Scheduling Cell Group ID (or ACK/NACK Cell Group ID) parameter is included in an RRC signaling message, a UE performs soft combining on scheduling signals (or ACK/NACK signals) received from the cells having the same Scheduling Cell Group ID (or ACK/NACK Cell Group ID). However, when the Scheduling Cell Group ID (or ACK/NACK Cell Group ID) parameter is not included in the RRC signaling message, the UE performs soft combining on scheduling signals (or ACK/NACK signals) received from the cells belonging to the same TPC Radio Link Set.

Fourth, when Method 3 is used, the following signaling parameter (4) can be defined for use in another embodiment of the present invention.

(4) An Explicit Cell Group Indicator comprising an indicator indicating whether a Cell Group for transmission of scheduling information or ACK/NACK information is coincident with the TPC Radio Link Set for TPC transmission. If an Explicit Cell Group Indicator is set to 'on', it means that a Scheduling Cell Group and ACK/NACK Cell Group are explicitly signaled because a Cell Group for transmission of scheduling information or ACK/NACK information is not coincident with the TPC Radio Link Set. In this case, the signaling parameters defined for Method 2, together with the TPC Radio Link Set, should be signaled.

However, if an Explicit Cell Group Indicator is set to 'off', it means that a Scheduling Cell Group and ACK/NACK Cell Group are inexplicitly signaled because a Cell Group for transmission of scheduling information or ACK/NACK information is coincident with the TPC Radio Link Set. In this case, only the TPC Radio Link Set is signaled. The Explicit Cell Group Indicator can be provided either separately or in common for the scheduling information and the ACK/NACK information.

FIGS. 8 and 9 are diagrams illustrating examples of the signaling parameters for signaling the cell group information which is related to scheduling signals or ACK/NACK signals. FIG. 8 is a diagram illustrating a format of a Radio Link (RL) Setup/Addition Response message as an example of a signaling message transmitted from a Node B to an RNC according to Method 3. When there is a drifting RNC (DRNC) in addition to a serving RNC (SRNC), an Iur signaling message is transmitted from the DRNC to the SRNC and is similar to a signaling message transmitted from a Node B to an RNC, therefore a description thereof will be omitted for clarity and conciseness.

Referring to FIG. 8, the message includes an RL Information Response information element (IE). The RL Information Response IE is a parameter included in a response message by a Node B upon receiving a request for setup or addition of a radio link from an RNC.

The Node B selectively includes Scheduling Cell Group ID, ACK/NACK Cell Group ID, and Exclusion Cell Indicator in the RL Information Response IE for each radio link according to an embodiment of the present invention. That is, the Node B inserts Scheduling Cell Group ID and ACK/NACK Cell Group ID in the RL Information Response IE if a Cell Group for transmission of scheduling information or ACK/NACK information is not coincident with the TPC Radio Link Set.

However, if a Cell Group for transmission of scheduling information or ACK/NACK information is coincident with the TPC Radio Link Set, the Node B does not include Scheduling Cell Group ID and ACK/NACK Cell Group ID in the RL Information Response IE. In addition, the Node B includes the Exclusion Cell Indicator in the RL Information Response IE if scheduling information or ACK/NACK information is not transmitted through a corresponding cell. However, if the scheduling information or ACK/NACK information is transmitted through the corresponding cell, the Node B does not include the Exclusion Cell Indicator in the RL Information Response IE.

FIG. 9 is a diagram illustrating an example of a format of a signaling message which is transmitted from an RNC to a UE according to an embodiment of the present invention. By way of example, FIG. 9 illustrates a format of an Active Set Update Request message which is transmitted from an RNC to a UE according to an embodiment of the present invention.

Referring to FIG. 9, the Radio Link Addition Information IE is a parameter included in an RRC message, with which an RNC requests a UE to add/delete a radio link to/from its active set. The RNC adds the Explicit Cell Group Indicator for each UE to the Radio Link Addition information IE, and then adds the Scheduling Cell Group Index and ACK/NACK Cell Group Index for each radio link to the Radio Link Addition Information IE only when the Explicit Cell Group Indicator is set to 'on'.

The UE can determine whether it will soft-combine scheduling information or ACK/NACK information included in the same TPC radio link set or whether it will soft-combine scheduling information (or ACK/NACK Cell Group) included in the same Scheduling Cell Group, by analyzing the Explicit Cell Group Indicator. The RNC sets the Exclusion Cell Indicator in the radio link through which it will transmit no scheduling information or ACK/NACK information.

In yet another method according to an embodiment of the present invention, the RNC can add the Exclusion Cell Indicator only when it satisfies a condition wherein the Explicit Cell Group Indicator='on'.

As can be understood from the foregoing descriptions, when a UE is located in a soft or softer handover region, the UE is informed whether or not the same scheduling or ACK/NACK signals were transmitted so that it can properly soft-combine the scheduling signals and ACK/NACK signals. In addition, a Node B informs the UE of the cells which are transmitting scheduling and ACK/NACK signals without using a separate signaling according to the transmission/non-transmission of the same scheduling or ACK/NACK signals, thereby efficiently using the limited radio resources.

While the invention has been shown and described with reference to a number of exemplary embodiments thereof, it will be understood by those skilled in the art that various changes in form and details may be made therein without departing from the spirit and scope of the invention as defined by the appended claims.

What is claimed is:

1. A method for receiving scheduling signals for an uplink packet data service by a user equipment (UE) in a mobile communication system, the method comprising the steps of:

receiving a radio resource control (RRC) signaling message including cell group information from a radio network controller (RNC);

acquiring the cell group information identifying scheduling cell groups transmitting independent scheduling signals for controlling a data rate of the uplink packet data service, wherein cells of a scheduling cell group transmit the same scheduling signals and the scheduling cell group is controlled by a Node B;

receiving and demodulating scheduling signals received from a plurality of cells, and soft-combining scheduling signals received from cells belonging to at least one identified scheduling cell group and not soft-combining scheduling signals received from cells not belonging to the at least one identified scheduling cell group, according to the cell group information; and determining the data rate for the uplink packet data service according to the soft-combined signals, wherein the UE is located in a soft and/or softer handover region.

2. The method of claim 1, wherein the cell group information comprises a scheduling cell group identifier (ID) for distinguishing each scheduling cell group transmitting an independent scheduling signal.

3. The method of claim 1, wherein the cell group information further comprises an exclusion cell indicator for indicating a cell that is included in an active set of the UE but which does not transmit a scheduling signal.

4. The method of claim 1, wherein the cell group information further comprises an acknowledge/negative-acknowledge (ACK/NACK) cell group ID for distinguishing each cell group including cells transmitting the same ACK/NACK signals for the uplink packet data service.

5. The method of claim 1, wherein the cell group information further comprises an explicit cell group indicator for indicating whether the scheduling cell group including the cells transmitting the same scheduling signals is coincident with a transmission power control (TPC) radio link set representing cells transmitting the same TPCs.

6. The method of claim 1, wherein the acquiring step comprises the steps of:

determining whether the scheduling cell group including the cells transmitting the same scheduling signals is coincident with a TPC radio link set representing cells transmitting the same TPCs; and receiving the radio resource control (RRC) signaling message and detecting the cell group information from the RRC signaling message if the scheduling cell group is not coincident with the TPC radio link set.

7. The method of claim 1, wherein the acquiring step comprises the steps of:

determining whether the scheduling cell group including the cells transmitting the same scheduling signals is coincident with a TPC radio link set representing cells transmitting the same TPCs;

receiving the RRC signaling message including TPC radio link set information representing the TPC radio link set from the RNC if the scheduling cell group is coincident with the TPC radio link set; and detecting the TPC radio link set information from the RRC signaling message and defining the TPC radio link set represented by the TPC radio link set information as a group of the cells transmitting the same scheduling signals.

8. A user equipment (UE) apparatus for receiving scheduling signals for an uplink packet data service in a mobile communication system, the apparatus comprising:

a scheduling signal reception controller for receiving a radio recourse control (RRC) signaling message including cell group information from a radio network controller (RNC), acquiring the cell group information identifying scheduling cell groups transmitting independent scheduling signals for controlling a data rate of the uplink packet data service, wherein cells of a scheduling cell group transmit the same scheduling signals and the scheduling cell group is controlled by a Node B;

at least one scheduling signal demodulator for independently demodulating scheduling signals received from a plurality of cells;

a soft combiner for soft-combining scheduling signals of cells belonging to at least one identified scheduling cell group and not soft-combining scheduling signals received from cells not belonging to the at least one identified scheduling cell group, according to the cell group information from among the scheduling signals received by the scheduling signal demodulator;

message decoders for decoding an output signal of the soft combiner or the scheduling signals received by the scheduling signal demodulators; and a data rate decider for determining the data rate for the uplink packet data service according to output signals of the message decoders, wherein the UE is located in a soft and/or softer handover region.

9. The apparatus of claim 8, wherein the cell group information comprises a scheduling cell group identifier (ID) for distinguishing each scheduling cell group transmitting an independent scheduling signal.

10. The apparatus of claim 8, wherein the cell group information further comprises an exclusion cell indicator for indicating a cell that is included in an active set of the UE but which does not transmit a scheduling signal.

11. The apparatus of claim 8, wherein the cell group information further comprises an acknowledge/negative-acknowledge (ACK/NACK) cell group ID for distinguishing each cell group including cells transmitting the same ACK/NACK signals for the uplink packet data service.

12. The apparatus of claim 8, wherein the cell group information further comprises an explicit cell group indicator for indicating whether the scheduling cell group including the cells transmitting the same scheduling signals is coincident with a transmission power control (TPC) radio link set representing cells transmitting the same TPCs.

13. The apparatus of claim 8, wherein the scheduling signal reception controller is configured to receive the radio resource control (RRC) signaling message including the cell group information from the RNC and detect the cell group information from the RRC signaling message if the scheduling cell group including the cells transmitting the same scheduling signals is not coincident with a TPC radio link set representing cells transmitting the same TPCs.

14. The apparatus of claim 8, wherein the scheduling signal reception controller comprises:

a first component configured to receive an RRC signaling message including TPC radio link set information representing the TPC radio link set from the RNC if the scheduling cell group including cells transmitting the same scheduling signals is coincident with a TPC radio link set representing cells transmitting the same TPCs; and a second component configured to detect the TPC radio link set information from the RRC signaling message and define the TPC radio link set represented by the TPC radio link set information as group of cells transmitting the same scheduling signals.

15. A method for supporting soft combining of scheduling signals for an uplink packet data service by a Node B in a mobile communication system, the method comprising the steps of:

identifying a scheduling cell group of cells transmitting the same scheduling signals from among a plurality of cells;

informing a radio network controller (RNC) of cell group information identifying scheduling cell groups transmitting independent scheduling signals;

generating scheduling signals in cells according to the identified scheduling cell groups, such that scheduling signals received from cells belonging to at least one identified scheduling cell group are soft-combined, and scheduling signals received from cells not belonging to the at least one identified scheduling cell group are not soft-combined, according to the cell group information; and transmitting the generated scheduling signals to a UE, wherein the UE is located in a soft and/or softer handover region.

16. The method of claim 15, wherein the cell group information comprises a scheduling cell group identifier (ID) for distinguishing each scheduling cell group transmitting an independent scheduling signal.

17. The method of claim 15, wherein the cell group information further comprises an exclusion cell indicator for indicating a cell that is included in an active set of the UE but which does not transmit a scheduling signal.

18. The method of claim 15, wherein the cell group information further comprises an acknowledge/negative-acknowledge (ACK/NACK) cell group ID for distinguishing each cell group including cells transmitting the same ACK/NACK signals for the uplink packet data service.

19. A Node B apparatus for supporting soft combining of scheduling signals for an uplink packet data service in a mobile communication system, the apparatus comprising:

a scheduling signal transmission controller for identifying a scheduling cell group of cells transmitting the same scheduling signals from among a plurality of cells, and informing a radio network controller (RNC) of cell group information identifying scheduling cell groups transmitting independent scheduling signals;

a scheduling signal generator for generating scheduling signals in cells according to the identified scheduling cell groups, such that scheduling signals received from cells belonging to at least one identified scheduling cell group are soft-combined, and scheduling signals received from cells not belonging to the at least one identified scheduling cell group are not soft-combined, according to the cell group information; and cell transmitters for transmitting the generated scheduling signals to the UE, wherein the UE is located in a soft and/or softer handover region.

20. The apparatus of claim 19, wherein the cell group information comprises a scheduling cell group identifier (ID) for distinguishing each scheduling cell group transmitting an independent scheduling signal.

21. The apparatus of claim 19, wherein the cell group information further comprises an exclusion cell indicator for indicating a cell that is included in an active set of the UE but which does not transmit a scheduling signal.

22. The apparatus of claim 19, wherein the cell group information further comprises an acknowledge/negative-acknowledge (ACK/NACK) cell group ID for distinguishing each cell group including cells transmitting the same ACK/NACK signals for the uplink packet data service.

23. A method for supporting soft combining of scheduling signals for an uplink packet data service by a radio link controller (RNC) in a mobile communication system, the method comprising the steps of:
    receiving cell group information identifying scheduling cell groups transmitting independent scheduling signals from a Node B controlling a plurality of cells, wherein cells of a scheduling cell group transmit the same scheduling signals; and
    transmitting a radio resource control (RRC) signaling message including the cell group information to a user equipment (UE) that performs the uplink packet data service and which is located in at least one of the plurality of cells,
    wherein the UE is located in a soft and /or softer handover region, such that scheduling signals received from cells belonging to at least one identified scheduling cell group are soft-combined, and scheduling signals received from cells not belonging to the at least one identified scheduling cell group are not soft-combined, according to the cell group information.

24. The method of claim 23, wherein the cell group information comprises a scheduling cell group identifier (ID) for distinguishing each scheduling cell group transmitting an independent scheduling signal.

25. The method of claim 23, wherein the cell group information further comprises an exclusion cell indicator for indicating a cell that is included in an active set of the UE but which does not transmit a scheduling signal.

26. The method of claim 23, wherein the cell group information further comprises an acknowledge/negative-acknowledge (ACK/NACK) cell group ID for distinguishing each cell group including cells transmitting the same ACK/NACK signals for the uplink packet data service.

27. The method of claim 23, wherein the cell group information further comprises an explicit cell group indicator for indicating whether the scheduling cell group including the cells transmitting the same scheduling signals is coincident with a transmission power control (TPC) radio link set representing cells transmitting the same TPCs.

28. A radio network controller (RNC) apparatus for supporting soft combining of scheduling signals for an uplink packet data service in a mobile communication system, the apparatus comprising:
    a receiver for receiving cell group information identifying scheduling cell groups transmitting independent scheduling signals from a Node B controlling a plurality of cells, wherein cells of a scheduling cell group transmit the same scheduling signals; and
    a transmitter for transmitting a radio resource control (RRC) signaling message including the cell group information to a user equipment (UE) that performs the uplink packet data service and which is located in at least one of the plurality of cells,
    wherein the UE is located in a soft and/or softer handover region, such that scheduling signals received from cells belonging to at least one identified scheduling cell group are soft-combined, and scheduling signals received from cells not belonging to the at least one identified scheduling cell group are not soft-combined, according to the cell group information.

29. The apparatus of claim 28, wherein the cell group information comprises a scheduling cell group identifier (ID) for distinguishing each scheduling cell group transmitting an independent scheduling signal.

30. The apparatus of claim 28, wherein the cell group information further comprises an exclusion cell indicator for indicating a cell that is included in an active set of the UE but which does not transmit a scheduling signal.

31. The apparatus of claim 28, wherein the cell group information further comprises an acknowledge/negative-acknowledge (ACK/NACK) cell group ID for distinguishing each cell group including cells transmitting the same ACK/NACK signals for the uplink packet data service.

32. The apparatus of claim 28, wherein the cell group information further comprises an explicit cell group indicator for indicating whether the scheduling cell group including the cells transmitting the same scheduling signals is coincident with a transmission power control (TPC) radio link set representing cells transmitting the same TPCs.

* * * * *